United States Patent
Kaku et al.

(10) Patent No.: US 10,615,441 B2
(45) Date of Patent: Apr. 7, 2020

(54) REDOX FLOW BATTERY

(71) Applicant: Sumitomo Electric Industries, Ltd., Osaka-shi (JP)

(72) Inventors: Hirokazu Kaku, Osaka (JP); Ryouta Tatsumi, Osaka (JP); Yongrong Dong, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 80 days.

(21) Appl. No.: 15/537,605

(22) PCT Filed: Dec. 15, 2015

(86) PCT No.: PCT/JP2015/085017
§ 371 (c)(1),
(2) Date: Jun. 19, 2017

(87) PCT Pub. No.: WO2016/104237
PCT Pub. Date: Jun. 30, 2016

(65) Prior Publication Data
US 2018/0269513 A1    Sep. 20, 2018

(30) Foreign Application Priority Data
Dec. 22, 2014  (JP) ................. 2014-259318

(51) Int. Cl.
*H01M 8/18* (2006.01)
(52) U.S. Cl.
CPC ............ *H01M 8/188* (2013.01); *H01M 8/18* (2013.01); *H01M 2300/0008* (2013.01); *H01M 2300/0011* (2013.01); *Y02E 60/528* (2013.01)

(58) Field of Classification Search
CPC .......... H01M 8/18; H01M 2300/0011; H01M 2300/0008; H01M 8/188; Y02E 60/528
USPC .................. 429/51, 109, 108, 105
See application file for complete search history.

(56) References Cited

U.S. PATENT DOCUMENTS

| 4,362,791 A | 12/1982 | Kaneko et al. |
| 2012/0045680 A1 | 2/2012 | Dong et al. |
| 2013/0045400 A1 | 2/2013 | Dong et al. |
| 2013/0196206 A1 | 8/2013 | Park et al. |

(Continued)

FOREIGN PATENT DOCUMENTS

| EP | 2725648 A1 | 4/2014 |
| JP | 57-009073 A | 1/1982 |

(Continued)

*Primary Examiner* — Jonathan G Jelsma
*Assistant Examiner* — Omar M Kekia
(74) *Attorney, Agent, or Firm* — Baker Botts L.L.P.; Michael A. Sartori

(57) ABSTRACT

A redox flow battery includes a battery cell including a positive electrode, a negative electrode, and a membrane disposed between these two electrodes; a positive electrode electrolyte supplied to the positive electrode; and a negative electrode electrolyte supplied to the negative electrode, wherein the positive electrode electrolyte contains manganese ions and a phosphorus-containing substance, the negative electrode electrolyte contains at least one species of metal ions selected from titanium ions, vanadium ions, chromium ions, and zinc ions, and a concentration of the phosphorus-containing substance is 0.001 M or more and 1 M or less.

8 Claims, 1 Drawing Sheet

(56) References Cited

U.S. PATENT DOCUMENTS

| | | | |
|---|---|---|---|
| 2014/0099569 A1* | 4/2014 | Oh | H01M 8/02 |
| | | | 429/498 |
| 2015/0380760 A1* | 12/2015 | Spaziante | H01M 8/188 |
| | | | 429/105 |
| 2016/0013506 A1 | 1/2016 | Dong et al. | |

FOREIGN PATENT DOCUMENTS

| | | |
|---|---|---|
| TW | 201203682 A1 | 1/2012 |
| WO | 2011/111254 A1 | 9/2011 |
| WO | 2011/111717 A1 | 9/2011 |
| WO | 2015/019972 A1 | 2/2015 |

* cited by examiner

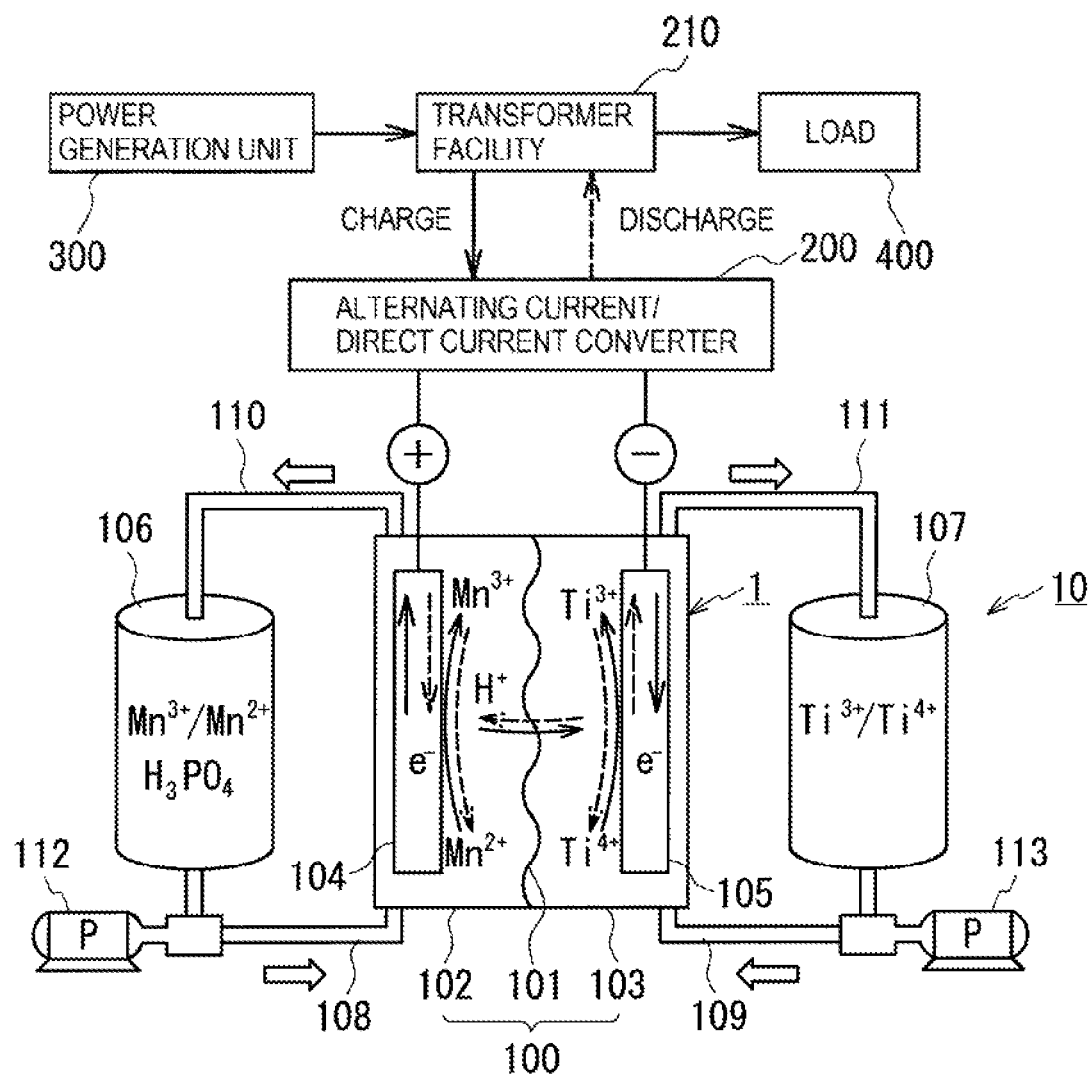

REDOX FLOW BATTERY

TECHNICAL FIELD

The present invention relates to a redox flow battery that employs a positive electrode electrolyte containing manganese ions. In particular, the present invention relates to a redox flow battery that enables suppression of precipitation of manganese oxide in the positive electrode electrolyte.

BACKGROUND ART

In recent years, with electric power shortage becoming serious, there have been challenges that are global rapid adoption of natural energy such as the adoption of wind power generation and solar photovoltaic power generation and the stabilization of power systems (for example, maintaining of frequency and voltage). One technique for addressing the challenges has been attracting attention and this technique is to install high-capacity storage batteries to achieve, for example, smoothing of output variations, storage of surplus power, and load leveling.

One of such high-capacity storage batteries is a redox flow battery (hereafter, sometimes referred to as an RF battery). The RF battery has the following features, for example: (i) a high capacity in the megawatt class (MW class) is easily achieved, (ii) the longevity is long, (iii) the state of charge (SOC) of the battery can be accurately monitored, and (iv) battery output and battery capacity can be independently designed, so that a high degree of freedom in design is provided. Thus, the RF battery is expected to be optimum as a storage battery used for the stabilization of power systems.

The RF battery mainly includes a battery cell including a positive electrode to which a positive electrode electrolyte is supplied, a negative electrode to which a negative electrode electrolyte is supplied, and a membrane disposed between the two electrodes. Typically, an RF battery system is constructed so as to include an RF battery and a circulation mechanism configured to circulate and supply, to the RF battery, electrolytes for the two electrodes. In general, the circulation mechanism includes a positive electrode tank storing a positive electrode electrolyte, a negative electrode tank storing a negative electrode electrolyte, and ducts individually connecting the tanks for the electrodes and the RF battery.

The electrolytes for the electrodes are typically solutions containing, as active materials, metal ions that undergo changes in valence by oxidation-reduction. Typically, there are an Fe—Cr-based RF battery employing iron (Fe) ions as the positive electrode active material, and chromium (Cr) ions as the negative electrode active material, and a V-based RF battery employing vanadium (V) ions as active materials for the two electrodes (refer to Patent Literature 1).

Patent Literature 1 discloses a Mn—Ti-based RF battery employing manganese (Mn) ions as a positive electrode active material, and employing, for example, titanium (Ti) ions as a negative electrode active material. The Mn—Ti-based RF battery is advantageous in that it provides a higher electromotive force than the existing V-based RF battery, and the raw material for the positive electrode active material is relatively inexpensive. In addition, Patent Literature 1 discloses that a positive electrode electrolyte containing manganese ions and also titanium ions enables suppression of generation of manganese oxide ($MnO_2$), so that the $Mn^{2+}/Mn^{3+}$ reaction proceeds with stability.

CITATION LIST

Patent Literature

PTL 1: International Publication No. 2011/111254

SUMMARY OF INVENTION

Technical Problem

In such a redox flow battery employing a solution containing manganese ions as the positive electrode electrolyte, further suppression of precipitation of manganese oxide ($MnO_2$) is desirable.

As described above, in the Mn—Ti-based RF battery, addition of titanium ions to the positive electrode electrolyte enables suppression of generation of manganese oxide ($MnO_2$). However, even such a positive electrode electrolyte containing manganese ions and also titanium ions, after repeated use for a long time, can cause generation of $MnO_2$. In other words, $MnO_2$ can be generated with time. For example, in the case of an operation of keeping a standby state with a positive electrode electrolyte having a high state of charge (SOC), $MnO_2$ may be generated with time. For the purpose of increasing the energy density, when the manganese ion concentration of the positive electrode electrolyte is increased, in particular, the manganese ion concentration is set to, for example, 0.8 M or more, or further 1 M or more, precipitation of $MnO_2$ is further promoted. Precipitation of $MnO_2$ causes a decrease in the amount of the positive electrode active material, which results in deterioration of battery performance such as a decrease in the energy density. In addition, precipitated $MnO_2$ may adhere to, for example, the electrode or the duct, which may result in an increase in the flow resistance of the electrolyte.

The present invention has been made under the above-described circumstances. An object of the present invention is to provide a redox flow battery that enables suppression of precipitation of manganese oxide in the positive electrode electrolyte.

Solution to Problem

A redox flow battery according to an embodiment of the present invention includes a battery cell including a positive electrode, a negative electrode, and a membrane disposed between these two electrodes; a positive electrode electrolyte supplied to the positive electrode; and a negative electrode electrolyte supplied to the negative electrode.

The positive electrode electrolyte contains manganese ions and a phosphorus-containing substance.

The negative electrode electrolyte contains at least one species of metal ions selected from titanium ions, vanadium ions, chromium ions, and zinc ions.

The concentration of the phosphorus-containing substance is 0.001 M or more and 1 M or less.

Advantageous Effects of Invention

The above-described redox flow battery enables suppression of precipitation of manganese oxide in the positive electrode electrolyte.

BRIEF DESCRIPTION OF DRAWING

FIG. 1 is an explanatory view illustrating the basic configuration and basic principle of operation of a redox flow battery system including a redox flow battery according to Embodiment 1.

DESCRIPTION OF EMBODIMENTS

Description of Embodiments According to the Present Invention

Features of embodiments according to the present invention will be first listed and described.

(1) A redox flow battery (RF battery) according to an embodiment of the present invention includes a battery cell including a positive electrode, a negative electrode, and a membrane disposed between these two electrodes; a positive electrode electrolyte supplied to the positive electrode; and a negative electrode electrolyte supplied to the negative electrode.

The positive electrode electrolyte contains manganese ions and a phosphorus-containing substance.

The negative electrode electrolyte contains at least one species of metal ions selected from titanium ions, vanadium ions, chromium ions, and zinc ions.

The concentration of the phosphorus-containing substance is 0.001 M or more and 1 M or less.

The concentration unit M means volumetric molar concentration, that is, mol/L (moles/liter). Hereafter, the same applies to concentrations.

In the above-described RF battery, the positive electrode electrolyte contains a specific amount of phosphorus-containing substance to thereby enable suppression of precipitation of manganese oxide.

(2) An example of the above-described RF battery relates to an embodiment in which the positive electrode electrolyte further contains titanium ions.

In this embodiment, the positive electrode electrolyte contains a specific amount of phosphorus-containing substance having the effect of suppressing precipitation of manganese oxide and also contains titanium ions, to thereby further suppress precipitation of manganese oxide.

(3) An example of the above-described RF battery relates to an embodiment in which, in the positive electrode electrolyte, a concentration of the titanium ions is 5 M or less.

In this embodiment, the positive electrode electrolyte has a titanium ion concentration satisfying the above-described specific range. As a result, sufficient dissolution can be achieved even when the electrolyte is an aqueous solution of an acid (such as an aqueous solution of phosphoric acid or diphosphoric acid), so that the electrolyte is easily produced.

(4) An example of the above-described RF battery relates to an embodiment in which the positive electrode electrolyte further contains at least one species of additive metal ions selected from magnesium ions, aluminum ions, cadmium ions, indium ions, tin ions, antimony ions, iridium ions, gold ions, lead ions, and bismuth ions.

The above-listed additive metal ions also have the effect of suppressing precipitation of manganese oxide. In the above-described embodiment, the positive electrode electrolyte contains a specific amount of phosphorus-containing substance having the effect of suppressing precipitation of manganese oxide and also contains additive metal ions, to thereby further suppress precipitation of manganese oxide. When the positive electrode electrolyte contains, in addition to the phosphorus-containing substance, the titanium ions and also additive metal ions, precipitation of manganese oxide can be more effectively suppressed.

(5) An example of the above-described RF battery relates to an embodiment in which a concentration of the additive metal ions is 0.001 M or more and 1 M or less. When plural species of additive metal ions are contained, the total concentration thereof satisfies the range.

In this embodiment, the concentration of additive metal ions in the positive electrode electrolyte satisfies the above-described specific range, to thereby further suppress precipitation of manganese oxide.

(6) An example of the above-described RF battery relates to an embodiment in which the phosphorus-containing substance includes at least one of phosphoric acid and diphosphoric acid.

This embodiment provides the following advantages: 1. since phosphoric acid and diphosphoric acid are soluble in water, the electrolyte can be prepared as an aqueous solution and the electrolyte is easily produced; 2. phosphoric acid and diphosphoric acid are materials commonly used in industry and hence are readily available; and 3. since phosphoric acid and diphosphoric acid are acidic, conductivity is easily ensured in the resultant electrolyte.

(7) An example of the above-described RF battery relates to an embodiment in which the negative electrode electrolyte contains the phosphorus-containing substance and/or the manganese ions.

In this embodiment, the electrolytes for the two electrodes have such a component in common, to thereby provide the following advantages: (i) even when electrolyte crossover occurs with time due to charge and discharge and an imbalance is caused between the liquid amounts of the electrolytes at the two electrodes, the imbalance is easily corrected, and (ii) the electrolytes are easily produced.

(8) An example of the above-described RF battery relates to an embodiment in which concentrations of the manganese ions in the positive electrode electrolyte and the negative electrode electrolyte, and/or a concentration of the metal ions in the negative electrode electrolyte is 0.3 M or more and 5 M or less. In the negative electrode electrolyte, when plural species of the metal ions (hereafter, sometimes referred to as negative electrode metal ions) are contained, the total concentration thereof satisfies the range.

This embodiment in which the concentration of manganese ions contained in the positive electrode electrolyte and functioning as a positive electrode active material or the concentration of negative electrode metal ions contained in the negative electrode electrolyte and functioning as a negative electrode active material satisfies the above-described specific range, provides the following advantages:

(I) a metal element that undergoes a valence-change reaction is contained in a sufficiently large amount and a high energy density can be achieved; and (II) sufficient dissolution can be achieved even when such an electrolyte is prepared as an aqueous solution of acid (such as an aqueous solution of phosphoric acid or diphosphoric acid); and the electrolyte is easily produced.

In the case where the negative electrode electrolyte contains manganese ions and the concentration of manganese ions at the negative electrode satisfies the above-described specific range, even when manganese ions at the positive electrode migrate with time to the negative electrode, manganese ions at the negative electrode inversely migrate to the positive electrode. Thus, a decrease in the battery capacity due to a relative decrease in the amount of positive electrode active material tends to be avoided. In addition, in the embodiment in which manganese ions are contained also for the negative electrode, as with the embodiment according to (7) above, the electrolytes for the two electrodes have the component in common. Thus, the embodiment also provides the above-described advantages (i) and (ii).

(9) An example of the above-described RF battery relates to an embodiment in which the negative electrode electrolyte contains titanium ions.

This embodiment provides a Mn—Ti-based RF battery that employs manganese ions as a positive electrode active material, and employs titanium ions as a negative electrode active material. In this embodiment, when titanium ions at the negative electrode migrate with time to the positive electrode, the positive electrode electrolyte contains the titanium ions, to thereby further suppress precipitation of manganese oxide.

(10) An example of the above-described RF battery relates to an embodiment in which the positive electrode electrolyte further contains sulfuric acid.

In this embodiment, the positive electrode electrolyte can be prepared as an acidic sulfuric-acid-based electrolyte. The electrolyte is easily prepared so as to have a high acidity, so that conductivity is easily ensured. In addition, in the embodiment, particularly when the phosphorus-containing substance is an acidic substance such as the above-described phosphoric acid or diphosphoric acid, it is less likely to considerably decrease the acidity of the sulfuric-acid-based electrolyte, so that conductivity is more easily ensured.

Details of Embodiments According to the Present Invention

Hereinafter, a redox flow battery according to an embodiment of the present invention will be described in detail with reference to the drawing.

Referring to FIG. 1, an RF battery according to Embodiment 1 will be described. In FIG. 1, the ions described in a positive electrode tank 106 and a negative electrode tank 107 are examples of the ion species contained in the electrolytes for the electrodes. In FIG. 1, the phosphoric acid described in the positive electrode tank 106 is an example of the phosphorus-containing substance contained in the positive electrode electrolyte. In FIG. 1, solid-line arrows indicate charge and broken-line arrows indicate discharge.

Overall Configuration

An RF battery system 10 includes an RF battery 1 and a circulation mechanism configured to circulate and supply electrolytes to the RF battery 1. Typically, the RF battery 1 is connected via, for example, an alternating current/direct current converter 200 and a transformer facility 210, to a power generation unit 300 and a load 400 such as a power system or a consumer; the RF battery 1 is charged with the power generation unit 300 serving as a power supply source, and is discharged to supply electric power to the load 400. Examples of the power generation unit 300 include a solar photovoltaic power generator, a wind power generator, and other ordinary power plants.

The RF battery 1 includes, as a main component, a battery cell 100 that includes a positive electrode cell 102 having a positive electrode 104 therein, a negative electrode cell 103 having a negative electrode 105 therein, and a membrane 101 disposed between the two electrodes 104 and 105 so as to separate the two cells 102 and 103 from each other, the membrane 101 being permeable to predetermined ions. The circulation mechanism includes the positive electrode tank 106 storing a positive electrode electrolyte circulated and supplied to the positive electrode 104; the negative electrode tank 107 storing a negative electrode electrolyte circulated and supplied to the negative electrode 105; ducts 108 and 110 connecting the positive electrode tank 106 to the battery cell 100; ducts 109 and 111 connecting the negative electrode tank 107 to the battery cell 100; and pumps 112 and 113 provided for the upstream (supply) ducts 108 and 109.

The RF battery system 10 has a circulation path of the positive electrode electrolyte constituted such that the positive electrode electrolyte is supplied from the positive electrode tank 106 via the upstream duct 108 to the positive electrode cell 102, and the positive electrode electrolyte is returned from the positive electrode cell 102 via the downstream (drainage) duct 110 to the positive electrode tank 106.

In addition, the RF battery system 10 has a circulation path of the negative electrode electrolyte constituted such that the negative electrode electrolyte is supplied from the negative electrode tank 107 via the upstream duct 109 to the negative electrode cell 103, and the negative electrode electrolyte is returned from the negative electrode cell 103 via the downstream (drainage) duct 111 to the negative electrode tank 107.

The RF battery system 10 is configured to be charged and discharged through valence-change reactions of metal ions serving as active materials in the electrolytes for the electrodes while using the circulation path of the positive electrode electrolyte and the circulation path of the negative electrode electrolyte so as to circulate and supply the positive electrode electrolyte to the positive electrode cell 102 (positive electrode 104), and to circulate and supply the negative electrode electrolyte to the negative electrode cell 103 (negative electrode 105).

Typically, the RF battery 1 employs a configuration that includes plural battery cells 100 and is referred to as a cell stack. Such a battery cell 100 typically has a configuration employing a cell frame including a bipolar plate (not shown) on one surface of which the positive electrode 104 is disposed and on the other surface of which the negative electrode 105 is disposed, and a frame (not shown) formed around the bipolar plate. The frame has liquid supply holes through which the electrolytes are supplied and liquid drainage holes through which the electrolytes are drained. Such plural cell frames are stacked so that the liquid supply holes and the liquid drainage holes constitute channels for the electrolytes. To these channels, the ducts 108 to 111 are connected. The cell stack is structured by repeatedly stacking a cell frame, the positive electrode 104, the membrane 101, the negative electrode 105, a cell frame, . . . , in this order. The basic structures of the RF battery 1 and the RF battery system 10 can be appropriately selected from known structures.

In the RF battery 1 according to Embodiment 1, the positive electrode electrolyte contains manganese ions, and the negative electrode electrolyte contains specific negative electrode metal ions. In particular, the RF battery 1 according to Embodiment 1 has a feature that the positive electrode electrolyte contains a phosphorus-containing substance. Hereinafter, the electrolytes will be described in detail.

Electrolytes

Positive Electrode Electrolyte

Manganese Ions

In the RF battery 1 and the RF battery system 10 (hereafter, sometimes collectively referred to as, for example, the RF battery 1) according to Embodiment 1, the positive electrode electrolyte contains manganese ions as a positive electrode active material. Manganese ions can have various valences. Typically, for example, divalent manganese ions ($Mn^{2+}$) and/or trivalent manganese ions ($Mn^{3+}$) are contained. In addition, the positive electrode electrolyte may contain tetravalent manganese ions. The tetravalent manganese ions probably correspond to $MnO_2$. However, this $MnO_2$ is present not as solid precipitate, but in a stable state of being dissolved in the electrolyte; and, during discharge, $Mn^{2+}$ provided by a two-electron reaction ($Mn^{4+}+2e^- \rightarrow Mn^{2+}$) is repeatedly usable as a positive electrode active material, which can contribute to an increase in the battery capacity. Thus, tetravalent manganese ions can be regarded as a positive electrode active material, and hence are treated as being different from manganese oxide that is solid precipitate. The allowable content of tetravalent manganese ions in the positive electrode electrolyte is relatively low, for example, about 10% or less of the total content (mol) of manganese ions.

In the positive electrode electrolyte, the concentration of manganese ions (hereafter, sometimes referred to as the Mn concentration) is, for example, 0.3 M or more and 5 M or less. When the Mn concentration is 0.3 M or more, an energy density sufficient for high-capacity storage batteries (for example, about 10 kWh/m$^3$) can be achieved. The higher the Mn concentration, the higher the energy density. For this reason, the Mn concentration may be 0.5 M or more, further 1.0 M or more, 1.2 M or more, or 1.5 M or more. For example, in the RF battery 1 according to Embodiment 1, since the positive electrode electrolyte contains a phosphorus-containing substance in a specific amount, even when the Mn concentration is increased to particularly 1 M or more, precipitation of precipitate such as manganese oxide can be sufficiently suppressed, so that manganese ions are present with stability. In the case where the positive electrode electrolyte further contains titanium ions, even when the Mn concentration is increased, precipitation of manganese oxide can be further suppressed, which is preferable. In consideration of the solubility in solvents, the Mn concentration may be 5 M or less, further 2 M or less, which contributes to ease of use and ease of production of the electrolyte. The concentrations of various species of metal ions and the concentration of a phosphorus-containing substance in the electrolytes for the electrodes can be determined by, for example, ICP emission spectrometry or ICP mass spectrometry.

Phosphorus-Containing Substance

For example, in the RF battery 1 according to Embodiment 1, the positive electrode electrolyte contains, in addition to manganese ions, a phosphorus-containing substance. This phosphorus-containing substance has a main function of suppressing precipitation of manganese oxide formed from a main positive electrode active material. Examples of the phosphorus-containing substance include compounds and mixtures containing phosphorus (P). Specific examples of the phosphorus-containing substance include phosphoric acids and phosphorus-containing chelating agents.

Examples of the phosphoric acids include inorganic phosphoric acids and organic phosphoric acids. Examples of the inorganic phosphoric acids include phosphoric acid ($H_3PO_4$, orthophosphoric acid), diphosphoric acid ($H_4 P_2 O_7$, pyrophosphoric acid), triphosphoric acid ($H_5 P_3 O_{10}$, tripolyphosphoric acid), and polyphosphoric acids having even higher molecular weights. Since inorganic phosphoric acids such as phosphoric acid and diphosphoric acid are soluble in water, when the phosphorus-containing substance is an inorganic phosphoric acid, the electrolyte can be prepared as an acid aqueous solution. Thus, the electrolyte is easily produced and the conductivity of the electrolyte is easily ensured. Organic phosphoric acids can be prepared so as to have increased solubility in solvents by adjusting functional groups, which contributes to ease of production of the electrolyte. Phosphoric acids are typically present as ions in electrolytes. The phosphorus-containing chelating agents cause chelation, which is expected to result in an increase in the electromotive force. Among the listed phosphorus-containing substances, only one species may be contained in an embodiment, and plural species in combination may be contained in another embodiment. For example, only phosphoric acid, only diphosphoric acid, or both of phosphoric acid and diphosphoric acid may be contained. Such positive electrode electrolytes containing phosphorus-containing substances can be easily produced by, for example, adding phosphoric acids, or adding phosphoric acid salts.

As will be described in Test example below, such a phosphorus-containing substance even in a small amount provides the effect of suppressing precipitation of precipitate such as manganese oxide ($MnO_2$). Dissolution of the phosphorus-containing substance in a solvent may be time-consuming. However, the amount of phosphorus-containing substance added can be set to a small amount, so that the time taken for dissolving the phosphorus-containing substance can be shortened, which contributes to ease of production of the electrolyte. Incidentally, the inventors of the present invention have found the following findings: an electrolyte containing manganese ions may be produced, in particular, as an aqueous solution containing manganese ions and sulfuric acid, such that the solution has a high Mn concentration of 0.5 M or more, further 0.8 M or more, or 1 M or more, or such that the solution further contains titanium ions and additive metal ions; and when, to the solution, a phosphorus-containing substance is further added, dissolution of the phosphorus-containing substance is time-consuming. Appropriate use of a stirrer device can shorten the time taken for achieving dissolution, which contributes to ease of production of the electrolyte.

In the positive electrode electrolyte, the concentration of a phosphorus-containing substance (when plural species are contained, the total concentration thereof) may be 0.001 M or more and 1 M or less. When the concentration is 0.001 M or more, generation of precipitate such as manganese oxide ($MnO_2$) can be suppressed. The higher the concentration, the stronger the effect of suppressing manganese oxide. Thus, the concentration may be set to 0.005 M or more, further 0.01 M or more. When the concentration of the phosphorus-containing substance is excessively high, for example, the solubility is degraded (particularly when titanium ions are contained, the solubility of titanium ions is degraded), and ease of production of the electrolyte is degraded. When the concentration of the phosphorus-containing substance is set to 0.8 M or less, further 0.5 M or less, the above-described effect of suppressing precipitation is sufficiently provided and the time taken for achieving dissolution can also be shortened. Thus, the electrolyte is easily produced, which is preferable.

Additive Metal Ions

For example, in the RF battery 1 according to Embodiment 1, the positive electrode electrolyte may further contain ions that provide the above-described effect of suppressing precipitation of manganese oxide. Such precipitation-suppressing ions are, for example, at least one species of additive metal ions selected from magnesium ions, aluminum ions, cadmium ions, indium ions, tin ions, antimony ions, iridium ions, gold ions, lead ions, and bismuth ions. These species of metal ions listed as additive metal ions can have various valences as described in examples below, and can also have other valences. The positive electrode electrolyte may contain, among the above-described additive metal ions, at least one ion species having a valence in an embodiment. The electrolyte may contain ions of the same element that have different valences.

[1] Magnesium ions: monovalent magnesium ions, and divalent magnesium ions
[2] Aluminum ions: monovalent aluminum ions, divalent aluminum ions, and trivalent aluminum ions
[3] Cadmium ions: monovalent cadmium ions, and divalent cadmium ions
[4] Indium ions: monovalent indium ions, divalent indium ions, and trivalent indium ions
[5] Tin ions: divalent tin ions, and tetravalent tin ions
[6] Antimony ions: trivalent antimony ions, and pentavalent antimony ions
[7] Iridium ions: monovalent iridium ions, divalent iridium ions, trivalent iridium ions, tetravalent iridium ions, pentavalent iridium ions, and hexavalent iridium ions
[8] Gold ions: monovalent gold ions, divalent gold ions, trivalent gold ions, tetravalent gold ions, and pentavalent gold ions
[9] Lead ions: divalent lead ions, and tetravalent lead ions
[10] Bismuth ions: trivalent bismuth ions, and pentavalent bismuth ions The species of metal ions listed as additive metal ions even in small amounts, together with the above-described phosphorus-containing substance also added, can further enhance the effect of suppressing precipitation of precipitate such as manganese oxide ($MnO_2$). The amount of additive metal ions added can be set to a small amount, to thereby easily suppress a decrease in the ratio of the positive electrode active material in the positive electrode electrolyte due to the additive metal ions contained. In other words, an increase in the ratio of the positive electrode active material in the positive electrode electrolyte is easily achieved, so that an increase in the energy density is expected to be easily achieved. It is considered that the above-listed species of metal ions mainly function as agents for suppressing precipitation of manganese oxide, and substantially do not function as positive electrode active materials. However, some ion species may function as active materials (for example, lead ions). When additive metal ions also function as positive electrode active materials, the energy density can be further increased. Among the above-listed metal ions as additive metal ions, a single species of additive metal ions may be contained in an embodiment, and plural species of additive metal ions may be contained in another embodiment.

The concentration of additive metal ions in the positive electrode electrolyte (when plural species of additive metal ions are contained, the total concentration thereof) is, for example, 0.001 M or more and 1 M or less. When the concentration is 0.001 M or more, generation of precipitate such as manganese oxide ($MnO_2$) can be effectively suppressed. The higher the concentration, the stronger the expected effect of suppressing manganese oxide. For this reason, the concentration may be 0.005 M or more, further 0.01 M or more. An excessively high concentration of additive metal ions results in a decrease in the ratio of the positive electrode active material in the positive electrode electrolyte, which further results in a decrease in the energy density. Thus, the concentration of additive metal ions is preferably 0.8 M or less, further 0.5 M or less.

The concentration of additive metal ions in the positive electrode electrolyte preferably satisfies the above-described range not only in an unused state prior to operation but also at any time during use of the electrolyte. Incidentally, the additive metal ions can enter the negative electrode electrolyte due to, for example, electrolyte crossover occurring with time. In other words, the concentration of additive metal ions in the positive electrode electrolyte varies with time, typically tends to decrease with time. By adding additive metal ions so as to satisfy the above-described range even when the amount of the additive metal ions in the positive electrode electrolyte decreases with time, a strong effect of suppressing precipitation is provided for a long period of time. While the positive electrode electrolyte is used, a procedure may be performed so as to return, to the positive electrode electrolyte, additive metal ions having entered the negative electrode electrolyte, so that the strong effect of suppressing precipitation can be maintained for a long period of time.

Titanium Ions

For example, in the RF battery 1 according to Embodiment 1, the positive electrode electrolyte may further contain titanium ions. The titanium ions in the positive electrode electrolyte function as an agent for suppressing precipitation of manganese oxide, and substantially do not function as a positive electrode active material. When the positive electrode electrolyte contains, in addition to a phosphorus-containing substance, titanium ions, the effect of suppressing precipitation of manganese oxide can be enhanced. When the positive electrode electrolyte contains, in addition to a phosphorus-containing substance, the above-described additive metal ions and also titanium ions, the effect of suppressing precipitation can be markedly enhanced as described in Test example below.

The titanium ions in the positive electrode electrolyte are present as tetravalent titanium ions (mainly $Ti^{4+}$) and/or trivalent titanium ions. The tetravalent titanium ions include $TiO^{2+}$, for example. The concentration of titanium ions in the positive electrode electrolyte (hereafter, sometimes referred to as the Ti concentration) is, for example, 5 M or less (except 0). When the Ti concentration is 5 M or less, preferably 2 M or less, sufficient dissolution can be achieved even when, for example, the electrolyte is prepared as an acid aqueous solution, and the electrolyte is easily produced. The Ti concentration in the positive electrode electrolyte may be about 0.3 M or more and about 2 M or less, further, about 0.5 M or more and about 1.5 M or less, which probably contributes to ease of use. The Mn concentration and the Ti concentration may be the same in an embodiment, and may be different in another embodiment. As described later, when the negative electrode electrolyte contains titanium ions, the Ti concentration in the positive electrode electrolyte can be set, so as to correspond to the concentration of titanium ions in the negative electrode electrolyte, to 0.3 M or more, 0.5 M or more, or further 1 M or more.

Negative Electrode Electrolyte

For example, in the RF battery 1 according to Embodiment 1, the negative electrode electrolyte contains, as a negative electrode active material, at least one species of metal ions (negative electrode metal ions) selected from titanium ions, vanadium ions, chromium ions, and zinc ions. Each species of these negative electrode metal ions may be combined with manganese ions serving as a positive electrode active material to thereby form a redox couple providing a high electromotive force. All the species of the negative electrode metal ions can have various valences as described in examples below. The negative electrode electrolyte contains, among the above-described negative electrode metal ions, at least one ion species having a valence. The electrolyte may contain ions of the same element that have different valences. The negative electrode electrolyte may contain such elements in the form of ions and also in the form of solid metal. Among the metal ions listed as negative electrode metal ions, a single species of negative electrode metal ions may be contained in an embodiment, and plural species of negative electrode metal ions may be contained in another embodiment.

(w) Titanium ions: trivalent titanium ions, and tetravalent titanium ions (x) Vanadium ions: divalent vanadium ions, and trivalent vanadium ions (y) Chromium ions: divalent chromium ions, and trivalent chromium ions (z) Zinc ions: divalent zinc ions In particular, a Mn—Ti-based RF battery that contains titanium ions as a negative electrode active material provides the following advantages: (i) an electromotive force of about 1.4 V is provided, and (ii) when titanium ions migrate with time from the negative electrode electrolyte to the positive electrode electrolyte, the titanium ions can function as an agent for suppressing precipitation of manganese oxide in the positive electrode electrolyte.

When plural species of negative electrode metal ions are contained, a combination of the species can be selected in consideration of the standard oxidation-reduction potentials of these species of negative electrode metal ions, that is, a combination of metal ions having a higher potential and metal ions having a lower potential can be selected. In this case, the utilization ratio of the negative electrode metal ions in the negative electrode electrolyte can be increased, which can contribute to an increase in the energy density. For example, titanium ions and vanadium ions are contained in an embodiment.

The concentration of negative electrode metal ions in the negative electrode electrolyte (when plural species of negative electrode metal ions are contained, the total concentration thereof) is, for example, 0.3 M or more and 5 M or less. When the concentration is 0.3 M or more, an energy density sufficient for high-capacity storage batteries (for example, about 10 kWh/m$^3$) can be achieved. The higher the concentration, the higher the energy density. For this reason, the concentration may be 0.5 M or more, further 1.0 M or more, 1.2 M or more, or 1.5 M or more. In consideration of the solubility in solvents, the concentration may be 5 M or less, or further 2 M or less, which contributes to ease of use and ease of production of the electrolyte.

The negative electrode electrolyte may contain components that are also contained in the positive electrode electrolyte. Specifically, the negative electrode electrolyte may contain a phosphorus-containing substance, or may contain manganese ions, or may contain both of a phosphorus-containing substance and manganese ions. When the electrolytes for the two electrodes have, in common, at least a part of the components, the imbalance occurring with time and between the amounts of electrolytes at the two electrodes is easily corrected, and the electrolyte is easily produced. When the negative electrode electrolyte contains a phosphorus-containing substance, among those listed above in the section of Phosphorus-containing substance, a single species may be contained in an embodiment, and plural species in combination may be contained in another embodiment. The phosphorus-containing substances contained in the electrolytes for the two electrodes may be of the same species in an embodiment, and may be of at least partially different species in another embodiment.

Components of Electrolytes for Two Electrodes

In order to further enhance the effect of suppressing precipitation of manganese oxide, the positive electrode electrolyte preferably contains manganese ions, a phosphorus-containing substance, titanium ions, and additive metal ions, and the negative electrode electrolyte preferably contains titanium ions. Furthermore, when each of the positive electrode electrolyte and the negative electrode electrolyte contains manganese ions, titanium ions, and a phosphorus-containing substance, the following advantages are provided: ($\alpha$) a decrease in the battery capacity due to a decrease in the amount of active material with time tends to be avoided, ($\beta$) an imbalance between the liquid amounts of electrolytes at the two electrodes due to electrolyte crossover is easily corrected, ($\gamma$) changes in the concentrations due to migration of manganese ions and titanium ions to counter electrodes tend to be prevented, and ($\delta$) the electrolytes are easily produced.

The concentrations of manganese ions, the concentrations of titanium ions, and the concentrations of a phosphorus-containing substance in the electrolytes for the two electrodes may be different for the two electrodes in an embodiment, and may be the same for the two electrodes in another embodiment. The valences of manganese ions and the valences of titanium ions in the electrolytes for the two electrodes may be different for the two electrodes in an embodiment, and may be the same for the two electrodes in another embodiment. The concentration of manganese ions and the concentration of titanium ions in the negative electrode electrolyte may be the same in an embodiment, and may be different in another embodiment. When the concentrations and also valences of manganese ions are the same between the electrolytes for the two electrodes, the concentrations and also valences of titanium ions between the electrolytes for the two electrodes are the same, and the concentrations of a phosphorus-containing substance are the same between the electrolytes for the two electrodes, the electrolytes are more easily produced.

Solvent of Electrolytes Etc.

The above-described metal ions contained in the electrolytes for the electrodes are all water-soluble ions. Accordingly, as the positive electrode electrolyte and the negative electrode electrolyte, aqueous solutions containing water as the solvent are preferably used. In particular, when such an electrolyte is prepared, from a material that is sulfuric acid or sulfate, as an aqueous solution containing sulfuric acid, the following plural advantages are expected to be provided: (A) enhancement of the stability of plural species of metal ions, enhancement of the reactivity of metal ions serving as an active material, and enhancement of solubility may be achieved, (B) even when metal ions having a high potential such as manganese ions are used, a side reaction tends not to occur (electrolysis of water tends not to occur), (C) a high ion conductivity and a low battery internal resistance are achieved, (D) unlike the case of using hydrochloric acid, chlorine gas is not generated, and (E) the electrolyte is easily obtained from sulfate or the like and water, that is, easily produced. Such an electrolyte that is an aqueous solution of sulfuric acid and is prepared with sulfuric acid or sulfate typically contains, for example, sulfuric acid ($H_2SO_4$) or sulfonic acid (R—$SO_3$H, where R represents a substituent). When an electrolyte is prepared as an acid solution having a high concentration of acid, generation of precipitate such as manganese oxide can be suppressed to a certain degree. Such electrolytes may also be aqueous solutions prepared with, instead of sulfuric acid or sulfate, other known acids (such as nitric acid) or other known salts (such as nitrate).

In particular, the positive electrode electrolyte according to an embodiment may contain a phosphorus-containing substance, and both of sulfuric acid and an inorganic phosphoric acid that is particularly phosphoric acid or diphosphoric acid. In this embodiment, the inorganic phosphoric acid and sulfuric acid are both acidic, which facilitates production of an acidic electrolyte. The concentration of sulfuric acid is preferably about 1 M or more and about 10 M or less. When the concentration of sulfuric acid is higher than the concentration of the phosphorus-containing substance, the electrolyte as a whole tends to have a high acid concentration and, as a result, the conductivity of the electrolyte can be sufficiently ensured.

Materials Etc. For Other Members

Electrodes

The material for the positive electrode 104 and the negative electrode 105 may be a material mainly formed of carbon fiber, for example, non-woven fabric (carbon felt) or paper. Use of carbon felt electrodes provides the following advantages: (a) in the case of using aqueous solutions as electrolytes, even at the oxygen generation potential during charge, oxygen gas tends not to generate, (b) the surface area is large, and (c) the permeability to electrolytes is high. Known electrodes can be used.

Membrane

The membrane 101 is, for example, an ion-exchange membrane such as a cation-exchange membrane or an anion-exchange membrane. Such an ion-exchange membrane provides the following advantages: (A) a high capability of separating ions serving as a positive electrode active material and ions serving as a negative electrode active material from each other is provided, and (B) a high permeability to H$^+$ ions, which are charge carriers within the battery cell 100, is provided. Thus, ion-exchange membranes can be suitably used as the membrane 101. Known membranes can be used.

Advantages

The RF battery 1 and the RF battery system 10 according to Embodiment 1 include a positive electrode electrolyte that has a specific liquid composition containing manganese ions and also a specific amount of phosphorus-containing substance, to thereby suppress precipitation of manganese oxide.

Hereinafter, the effect of suppressing precipitation of manganese oxide in, for example, the RF battery 1 according to Embodiment 1 will be specifically described with reference to Test example.

Test Example 1

The RF battery system 10 including the RF battery 1 according to Embodiment 1 was constructed, and the effect of adding manganese ions and also a phosphorus-containing substance to the positive electrode electrolyte was examined. In addition, the effect of adding titanium ions and additive metal ions was also examined.

In this test, for each of the samples, the positive electrode electrolyte and the negative electrode electrolyte were prepared as acid aqueous solutions containing manganese ions. In addition, for each of the samples, manganese sulfate and sulfuric acid were used as raw materials. For samples containing a phosphorus-containing substance, phosphoric acid or diphosphoric acid was further used. For samples containing titanium ions, titanium sulfate was further used. For samples containing additive metal ions, bismuth sulfate was further used.

The compositions of positive electrode electrolytes used for the samples are described in Table 1. In Sample Nos. 1-100 and 1-1 (hereafter, collectively referred to as Group-1 Samples), positive electrode electrolytes contain, as metal ions, manganese ions alone. In Sample Nos. 2-100 and 2-1 to 2-4 (hereafter, collectively referred to as Group-2 Samples), in addition to manganese ions, titanium ions are contained. In Sample Nos. 3-100, 3-1, and 3-2 (hereafter, collectively referred to as Group-3 Samples), in addition to manganese ions and titanium ions, bismuth ions are further contained as additive metal ions. Each of the Samples will be described below.

In Sample No. 1-1, a positive electrode electrolyte containing a phosphorus-containing substance was prepared.

In Sample No. 1-1, the raw materials were adjusted such that the manganese ion concentration was 1 M, the sulfate ion concentration was 4 M, and the phosphorus-containing substance concentration was the concentration (M) described in Table 1.

In Sample Nos. 2-1 to 2-4, positive electrode electrolytes containing a phosphorus-containing substance and also titanium ions were prepared.

In Sample Nos. 2-1 to 2-4, the raw materials were adjusted such that the manganese ion concentration was 1 M, the titanium ion concentration was 1 M, the sulfate ion concentration was 5 M, and the phosphorus-containing substance concentrations were the concentrations (M) described in Table 1.

In Sample Nos. 3-1 and 3-2, positive electrode electrolytes containing a phosphorus-containing substance, titanium ions, and also bismuth ions as additive metal ions were prepared.

In Sample Nos. 3-1 and 3-2, the raw materials were adjusted such that, in the positive electrode electrolytes, the manganese ion concentration was 1 M, the titanium ion concentration was 1 M, the sulfate ion concentration was 5.15 M, the phosphorus-containing substance concentrations were the concentrations (M) described in Table 1, and the bismuth ion concentration was 0.1 M.

In Sample No. 1-100, a positive electrode electrolyte was prepared so as to contain manganese ions without containing a phosphorus-containing substance, titanium ions, or bismuth ions. The raw materials were adjusted such that, in this positive electrode electrolyte, the manganese ion concentration was 1 M, and the sulfate ion concentration was 4 M.

In Sample No. 2-100, a positive electrode electrolyte was prepared so as to contain manganese ions and titanium ions without containing a phosphorus-containing substance or bismuth ions. The raw materials were adjusted such that, in this positive electrode electrolyte, the manganese ion concentration was 1 M, the titanium ion concentration was 1 M, and the sulfate ion concentration was 5 M.

In Sample No. 3-100, a positive electrode electrolyte was prepared so as to contain manganese ions, titanium ions, and bismuth ions without containing a phosphorus-containing substance. The raw materials were adjusted such that, in this positive electrode electrolyte, the manganese ion concentration was 1 M, the titanium ion concentration was 1 M, the sulfate ion concentration was 5.15 M, and the bismuth ion concentration was 0.1 M.

In each of Samples, a negative electrode electrolyte was prepared so as to contain manganese ions (concentration: 1 M) and titanium ions (concentration: 1 M) without containing a phosphorus-containing substance or bismuth ions.

The RF battery system 10 was charged with the prepared electrolytes for the two electrodes under the conditions described below. Subsequently, the positive electrode electrolytes after the charge were taken out and stored in other vessels, and visually observed with time as to whether precipitate (here, manganese oxide) precipitated or not. The results are described in Table 1. The storage temperature was set to room temperature (here, 25° C.); or the electrolytes were stored in a thermostatic chamber and controlled to be at 40° C. The presence of precipitate can also be easily detected, for example, through a transparent window formed in, for example, a duct or a tank. When sediment was present in, for example, a duct, this sediment was sampled and subjected to component analysis; when the sediment was found to be manganese oxide, the presence of precipitate (sediment) was judged to be detected. Incidentally, in Table 1, in Elapsed time until detection of precipitation, "–" means that the test was not performed.

In the battery cell, carbon felt electrodes (9 cm$^2$) and a membrane that was a cation-exchange membrane were used. Such a battery cell and the prepared electrolytes (each 7 ml) for electrodes were used to produce a small cell, and this cell was charged. The cell was charged under conditions with a 315 mA constant current (constant current having a current density of 35 mA/cm$^2$) until the state of charge (SOC) of manganese ions reached 50%, 70%, or 90%.

The state of charge (SOC, %) of manganese ions was calculated by (charge quantity of electricity/theoretical quantity of electricity in single-electron reaction)×100. The charge quantity of electricity and the theoretical quantity of electricity in single-electron reaction are defined below. The single-electron reaction of manganese ions is $Mn^{2+} \rightarrow Mn^{3+} + e^-$. The Faraday constant is defined as 96,485 (A·s/mol).

Charge quantity of electricity($A \cdot h$)=Charge current ($A$)×Charge time($h$)

Theoretical quantity of electricity in single-electron reaction($A \cdot h$)=Volume of electrolyte($L$)×Concentration of manganese ions($mol/L$)×Faraday constant×1(electron)/3600 which positive electrode electrolytes contain manganese ions and titanium ions, the elapsed time until detection of precipitation is longer in Sample Nos. 2-1 to 2-4 containing 0.001 M or more of a phosphorus-containing substance than in Sample No. 2-100 without containing a phosphorus-containing substance; and it has been demonstrated that precipitation of manganese oxide is further suppressed. In particular, as described in Table 1, when electrolytes are at a relatively high temperature (here, at 40° C.), precipitation of manganese oxide tends to be promoted (see and compare the elapsed time until detection of precipitation at room temperature and the elapsed time until detection of precipitation at 40° C.). Even in such cases, it has been demonstrated that the presence of a phosphorus-containing substance in positive electrode electrolytes enables an increase in the elapsed time until detection of precipitation, in other words, enables suppression of precipitation of manganese oxide (see and compare Sample No. 2-100 and No. 2-1). In addition, as described in Table 1, it has been demonstrated that the higher the phosphorus-containing substance concentration, the higher the degree of suppression of precipitation of manganese oxide (see and compare Sample Nos. 2-1 to 2-4).

In addition, the elapsed time until detection of precipitation at room temperature is long in Group-2 Samples in which positive electrode electrolytes contain manganese ions and also titanium ions (Sample Nos. 2-100 and 2-1 to 2-4), compared with Group-1 Samples (Sample Nos. 1-100 and 1-1) without containing titanium ions. This has demonstrated that precipitation of manganese oxide tends to be further suppressed.

TABLE 1

| | | Composition of positive electrode electrolyte Concentration (M) | | | | | | Elapsed time until detection of precipitation (min, h, day) | |
|---|---|---|---|---|---|---|---|---|---|
| Sample Group | No. | Mn ions | Ti ions | Sulfuric acid | Bi ions | Phosphorus-containing substance (names of phosphorus-containing substances are described in parentheses) | SOC (%) | Room temperature | 40° C. |
| 1 | 1-100 | 1 | 0 | 4 | 0 | 0 | 50 | 0 min (immediately after charge) | — |
|   | 1-1 |   |   |   |   | 0.15 (phosphoric acid) |   | 10 min | — |
| 2 | 2-100 | 1 | 1 | 5 | 0 | 0 | 70 | 1 day | 12 min |
|   | 2-1 |   |   |   |   | 0.085 (phosphoric acid) |   | 1 day | 16 min |
|   | 2-2 |   |   |   |   | 0.15 (phosphoric acid) |   | — | 34 min |
|   | 2-3 |   |   |   |   | 0.085 (diphosphoric acid) |   | 3 days | 50 min |
|   | 2-4 |   |   |   |   | 0.25 (phosphoric acid) |   | — | 50 min |
| 3 | 3-100 | 1 | 1 | 5.15 | 0.1 | 0 | 90 | — | 32 h |
|   | 3-1 |   |   |   |   | 0.085 (diphosphoric acid) |   | 35 days | 65 h |
|   | 3-2 |   |   |   |   | 0.17 (phosphoric acid) |   | 39 days | 58 h |

As described in Table 1, in all the Sample Groups of Group 1 to Group 3, the elapsed time until detection of precipitation is longer in Samples in which positive electrode electrolytes contain a phosphorus-containing substance than in Samples in which positive electrode electrolytes do not contain a phosphorus-containing substance. This has demonstrated that precipitation of manganese oxide is suppressed. For example, in Group-1 Samples, in the positive electrode electrolyte (Sample No. 1-100) containing manganese ions without containing a phosphorus-containing substance, precipitation is detected immediately after charge at room temperature; in contrast, in the positive electrode electrolyte (Sample No. 1-1) containing manganese ions and a phosphorus-containing substance, precipitation is not detected until the time from completion of charge reaches as long as 10 minutes. In addition, in Group-2 Samples in In addition, as described in Table 1, it has been demonstrated that the presence of additive metal ions in positive electrode electrolytes containing manganese ions and titanium ions (Group-3 Samples) enables marked enhancement of the effect of suppressing precipitation of manganese oxide. This test has demonstrated that, compared with Sample No. 2-100 in which the positive electrode electrolyte contains titanium ions alone as the agent for suppressing precipitation, Sample No. 3-100 further containing additive metal ions (here, bismuth ions) enables an increase in the elapsed time until detection of precipitation by 10 or more times or even 100 or more times, compared with Sample No. 2-100, even when the electrolyte is at a relatively high temperature (here, at 40° C.).

In particular, as described in Table 1, it has been demonstrated that the presence of titanium ions and both of a phosphorus-containing substance and additive metal ions in positive electrode electrolytes containing manganese ions enables further enhancement of the effect of suppressing precipitation of manganese oxide (see and compare Sample No. 3-100 and Sample Nos. 3-1 and 3-2). This test has demonstrated that Sample Nos. 3-1 and 3-2 containing a phosphorus-containing substance and additive metal ions enable an increase in the elapsed time until detection of precipitation at room temperature by 30 or more times, compared with Sample No. 2-100 without containing a phosphorus-containing substance or additive metal ions. It has also been demonstrated that Sample Nos. 3-1 and 3-2 enable an increase in the elapsed time until precipitation by about two or more times, compared with Sample No. 3-100 without containing a phosphorus-containing substance, even when the electrolytes are at a relatively high temperature (here, at 40° C.).

In addition, as described in Table 1, it has been demonstrated that, even when the phosphorus-containing substance concentration is low, such as 1 M or less, further 0.5 M or less, or 0.3 M or less, suppression of precipitation of manganese oxide is sufficiently achieved. It has also been demonstrated that, when the phosphorus-containing substance concentration is 0.01 M or more or further 0.1 M or more, suppression of precipitation of manganese oxide is effectively achieved.

The present invention is not limited to such examples. The present invention is defined by Claims and is intended to embrace all the modifications within the meaning and range of equivalency of the Claims.

For example, Test example 1 describes cases where both of the positive electrode electrolyte and the negative electrode electrolyte contain manganese ions. However, advantages of the present invention can also be provided even when the following modifications are made:

1. the negative electrode electrolyte does not contain manganese ions;
2. the additive metal ions include, instead of bismuth ions or in addition to bismuth ions, at least one species selected from magnesium ions, aluminum ions, cadmium ions, indium ions, tin ions, antimony ions, iridium ions, gold ions, and lead ions;
3. the negative electrode electrolyte contains a phosphorus-containing substance and/or additive metal ions; and
4. at least one of the following is changed: the concentrations of individual species of metal ions, the species of the acid used as the solvents (for example, sulfuric acid is replaced by nitric acid), the concentration of the acid, the materials for the electrodes, the size of the electrodes, and the material for the membrane.

INDUSTRIAL APPLICABILITY

Redox flow batteries according to the present invention can be used as high-capacity storage batteries intended to achieve, for natural energy power generation such as solar photovoltaic power generation and wind power generation, stabilization of output variations, storage of surplus power, and load leveling, for example. Redox flow batteries according to the present invention can also be suitably used as high-capacity storage batteries that are placed adjacent to ordinary power plants and intended to address voltage sag and power failure and to achieve load leveling.

Reference Signs List 1 redox flow battery (RF battery)
10 redox flow battery system (RF battery system)
100 battery cell    101 membrane    102 positive electrode cell
103 negative electrode cell
104 positive electrode    105 negative electrode
106 positive electrode tank    107 negative electrode tank
108, 109, 110, and 111 ducts    112 and 113 pumps
200 alternating current/direct current converter
210 transformer facility    300 power generation unit
400 load

The invention claimed is:

1. A redox flow battery comprising: a battery cell including a positive electrode, a negative electrode, and a membrane disposed between these two electrodes; a positive electrode electrolyte supplied to the positive electrode; and a negative electrode electrolyte supplied to the negative electrode,
wherein the positive electrode electrolyte contains manganese ions and a phosphorus-containing substance,
the negative electrode electrolyte contains at least one species of metal ions selected from titanium ions, vanadium ions, chromium ions, and zinc ions,
a concentration of the phosphorus-containing substance is 0.001 M or more and 1 M or less,
the positive electrode electrolyte further contains at least one species of additive metal ions selected from magnesium ions, aluminum ions, cadmium ions, indium ions, tin ions, antimony ions, iridium ions, gold ions, lead ions, and bismuth ions, and
in the positive electrode electrolyte, a concentration of the additive metal ions is 0.001 M or more and 1 M or less.

2. The redox flow battery according to claim 1, wherein the positive electrode electrolyte further contains titanium ions.

3. The redox flow battery according to claim 2, wherein, in the positive electrode electrolyte, a concentration of the titanium ions is 5 M or less.

4. The redox flow battery according to claim 1, wherein the phosphorus-containing substance includes at least one of phosphoric acid and diphosphoric acid.

5. The redox flow battery according to claim 1, wherein the negative electrode electrolyte contains the phosphorus-containing substance and/or the manganese ions.

6. The redox flow battery according to claim 1, wherein concentrations of the manganese ions in the positive electrode electrolyte and the negative electrode electrolyte, and/or a concentration of the metal ions in the negative electrode electrolyte is 0.3 M or more and 5 M or less.

7. The redox flow battery according to claim 1, wherein the negative electrode electrolyte contains titanium ions.

8. The redox flow battery according claim 1, wherein the positive electrode electrolyte further contains sulfuric acid.

* * * * *